Aug. 22, 1961  D. L. PHILLIPS  2,997,639
CENTRIFUGAL ACTUATOR
Filed June 25, 1956  4 Sheets-Sheet 1

INVENTOR.
Delbert L. Phillips
BY
Smyth & Roston
Attorneys.

Aug. 22, 1961

D. L. PHILLIPS 2,997,639

CENTRIFUGAL ACTUATOR

Filed June 25, 1956

INVENTOR.
Delbert L. Phillips
BY
Smyth & Roston
Attorneys.

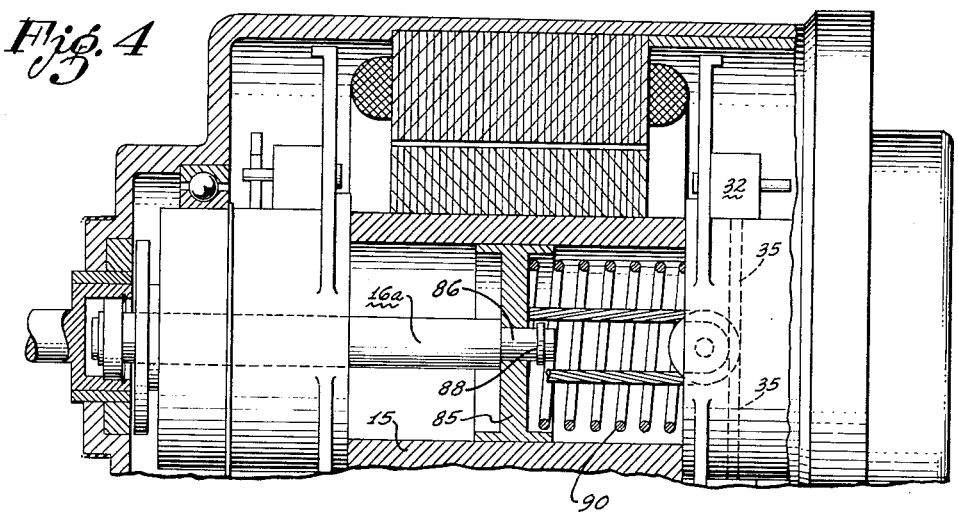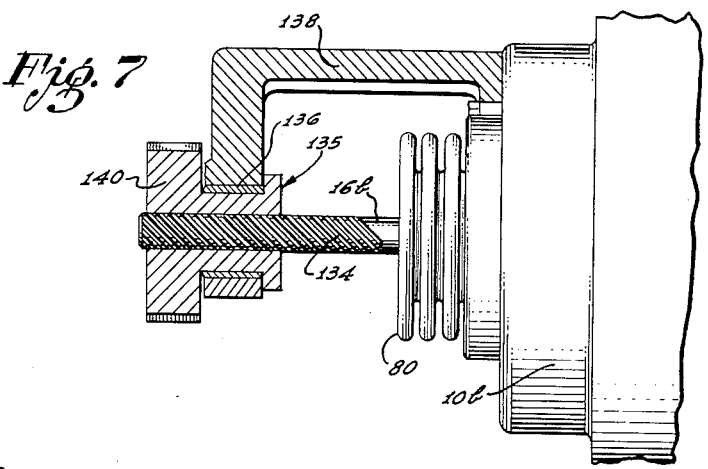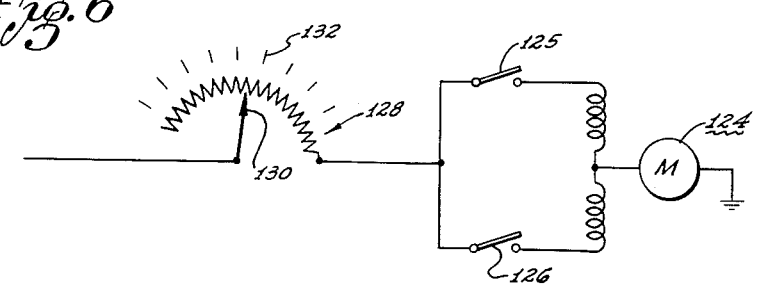

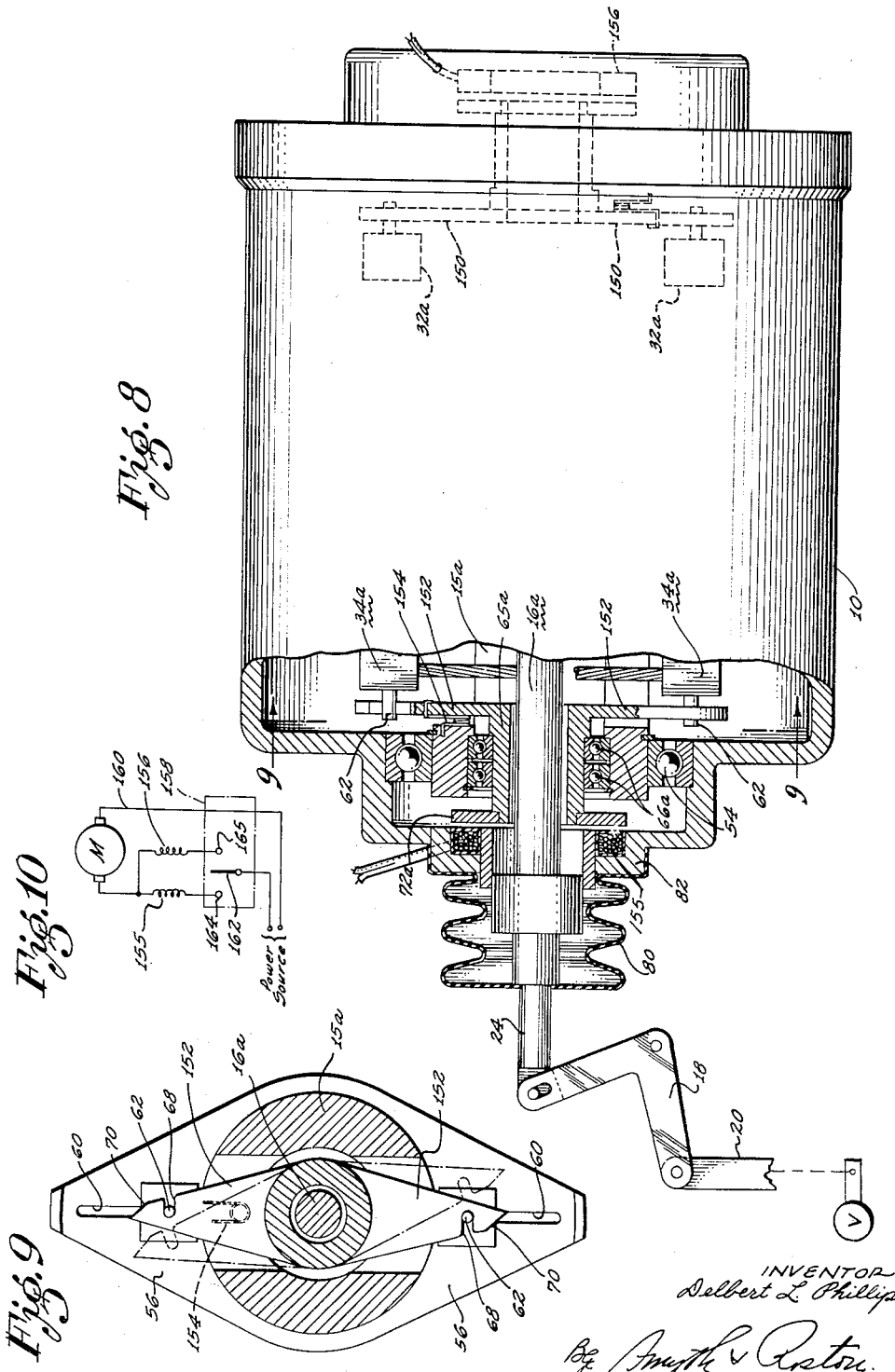

United States Patent Office 2,997,639
Patented Aug. 22, 1961

2,997,639
CENTRIFUGAL ACTUATOR
Delbert L. Phillips, Los Angeles, Calif., assignor to Telecomputing Corporation, a corporation of California
Filed June 25, 1956, Ser. No. 593,513
14 Claims. (Cl. 318—325)

This invention relates to actuating devices that are well suited for generating control forces and that may be readily adapted for remote control. For the purpose of disclosure and to illustrate the principles involved, the invention is disclosed herein as particularly applied to the remote operation of a valve or the like. It will be apparent, however, that the invention has utility in various fields and may be readily adapted to actuate various devices.

There is a pressing need for an actuating device of this general character that will ideally meet certain requirements. A summary of these requirements will be helpful for an understanding of the invention.

The actuator must be reliable for use where dependability is a foremost consideration, for example, to operate a valve or the like on an aircraft. The actuator must provide a liberal margin of operative force to function effectively in the event there is an unusual increase in the operating load, for example, in the event that a valve operated by the device tends to stick. Although the device is capable of exerting an operating force of high magnitude, nevertheless, the operating force must be applied smoothly with a progessive rise in magnitude rather than an abrupt rise. In contrast to a conventional solenoid, the device must be capable of acting in a positive manner in two opposite directions, with the same force and the same range of operating movement in both directions. The device must be versatile in the sense that it may be adapted for two-position operation to remain in either of two limit positions selectively when deenergized, or may be adapted for two-position operation to take a normal limit position when deenergized and an opposite limit position when energized, or may be adapted for three-position operation to assume two opposite position limit positions selectively when energized and to seek a third normal intermediate position when deenergized. The device should be adaptable for graduated control for use where it is desirable to stop the control movement at various intermediate positions selectively. The device must require only a relatively low rate of energy input but, nevertheless, must be capable of accumulating energy for an actuating thrust of relatively high magnitude. The device must not be susceptible to damage arising from such causes as jamming or failure of the instrumentality being controlled or arising from such causes as inadvertent reversal of operation.

The present invention meets all of these requirements by using centrifugal weight means on a rotor to generate the actuating force and by accelerating the rotor progressively to cause the centrifugal force to build up progressively. A liberal margin of operative force is provided by employing a speed range in which adequate centrifugal force is developed at a point well below the upper speed limit.

Smooth movement is an inherent characteristic of such an arrangement even when the operating load is relatively heavy. Positive operation in both directions is achieved by providing two centrifugal weight means oppositely connected to the operating load for selective use to create the required opposite forces. While various arrangements may be provided for operation of the two centrifugal weight means selectively, a feature of the preferred practice of the invention is the concept of using a reversible rotor with the two centrifugal weight means operatively responsive to the two opposite directions of rotation, respectively. Such selective responsiveness on the part of the two centrifugal weight means may be achieved by using two oppositely responsive drag latches to prevent centrifugal operation of the two centrifugal weight means, respectively.

The rotor may be actuated by various power means in various practices of the invention, including hydraulic motors, pneumatic motors, turbines driven by exhaust gases, etc. In the particular embodiments of the invention disclosed herein, electric power is employed. In this regard, a feature of the selected embodiments of the invention is the use of a motor for this purpose with the centrifugal weight means mounted on the rotor of the motor and with the rotor of hollow configuration to house portions of the weight-responsive actuating mechanism. A further feature of such a construction is that the motor together with the centrifugally-responsive mechanism may be readily sealed hermetically.

The various features and advantages of the invention may be understood from the following detailed description, considered with the accompanying drawings.

In the drawings, which are to be regarded as merely illustrative:

FIGURE 4 is a fragmentary longitudinal sectional view illustrating a second embodiment of the invention as a two position actuator which assumes a normal limit position when deenergized and the opposite limit position when energized;

FIGURE 5 is a fragmentary sectional view illustrating a third embodiment of the invention that functions as a three position actuator. The device assumes one limit position when energized in one respect, assumes the opposite limit position when energized in the opposite respect, and assumes an intermediate or neutral position when deenergized;

FIGURE 6 is a wiring diagram showing how a variable speed motor may be employed for selectively positioning the actuator of FIGURE 5 at points other than the two limit positions and the normal intermediate position;

FIGURE 7 is a fragmentary view, partly in section and partly in side elevation, showing how the actuator may be modified for rotary operating movement instead of linear operating movement;

FIGURE 8 is a side elevation with parts broken away illustrating a still further embodiment of the invention;

FIGURE 9 is a cross section taken as indicated by the line 9—9 of FIGURE 8 showing one of the two latches employed in this embodiment of the invention; and FIGURE 10 is a diagram of the wiring for this embodiment.

Figure 1:
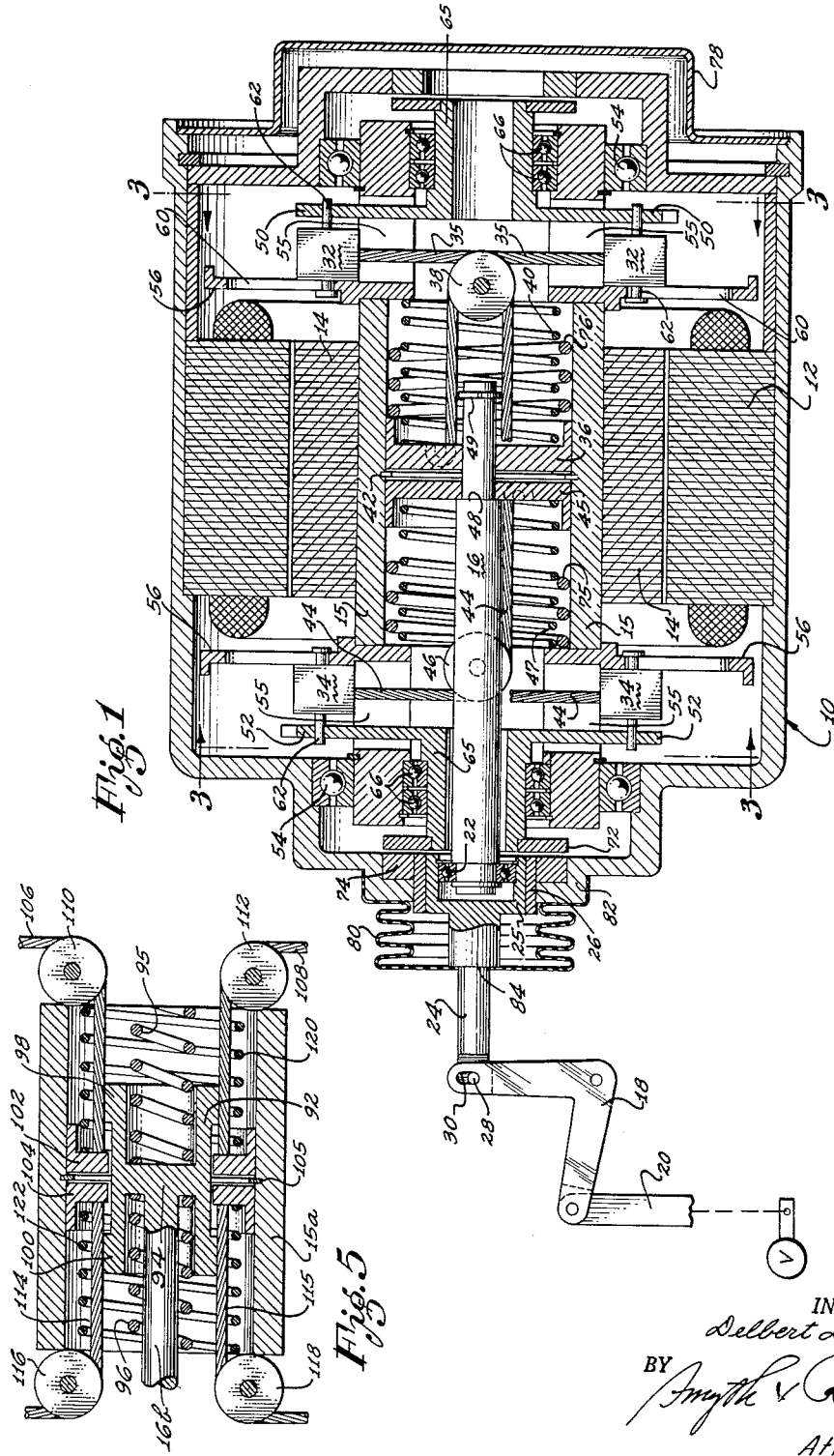
FIGURE 1 is a longitudinal sectional view of an embodiment of the invention that functions as a two-position actuator. The device may be energized in one respect to assume one limit position and will maintain that limit position until energized in the opposite respect to move to the opposite limit position.
Figure 2:
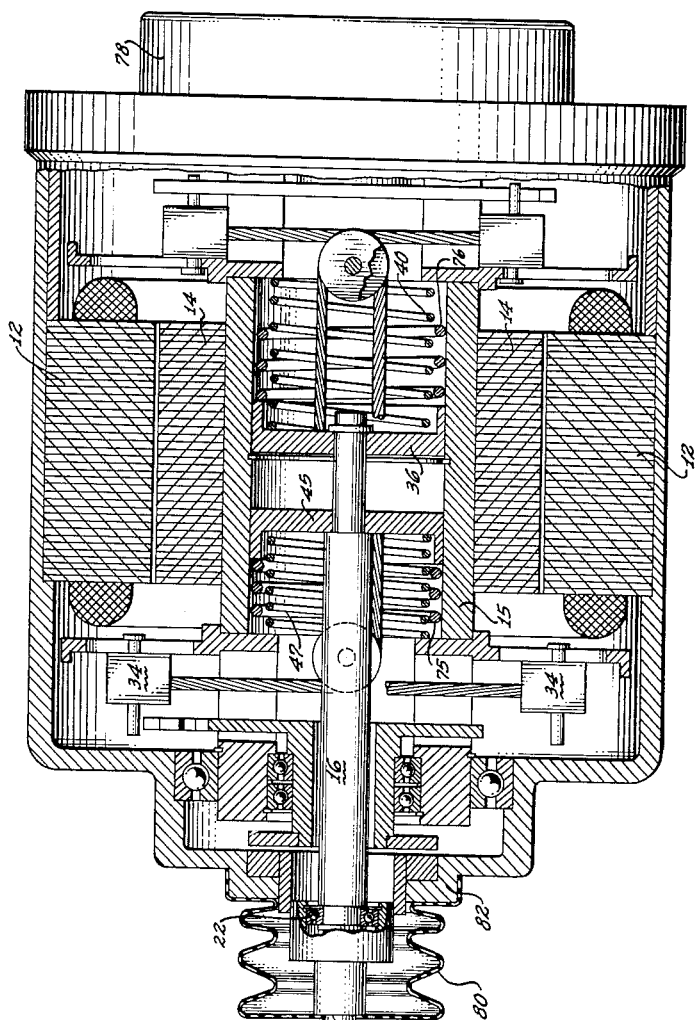
FIGURE 2 is a similar view showing how the device operates for movement from the limit position shown in FIGURE 1 to the opposite limit position.
Figure 3:
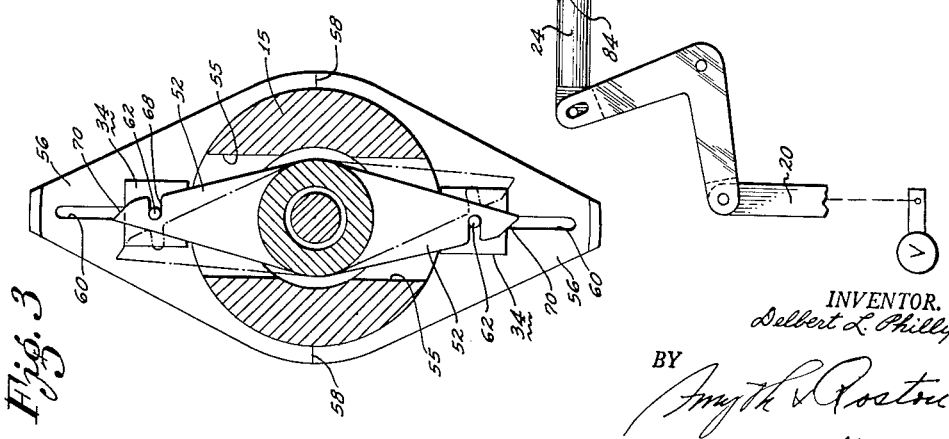
FIGURE 3 is a transverse section taken as indicated by the line 3—3 of FIGURE 1 and showing one of the latches for restraining a pair of centrifugal weights against outward movement.

The first embodiment of the invention shown in FIGURES 1 to 3 is incorporated in the construction of a motor that has a housing 10, stator 12 fixedly mounted inside the housing; and a rotor 14 mounted on a cylindrical rotor 15. For aircraft use the motor may be 1/64 horsepower and adapted for operation on 400 cycle A.C. current. The moving parts of the device include an operating means 16 in the form of a longitudinally movable rod positioned on the axis of the rotor to rotate with the rotor. In this instance, the axial operating rod 16 is operatively connected to a bell crank 18 and the bell crank, in turn, is connected by a link 20 to whatever instrumentality is to be controlled by the actuator. The link 20 may be connected, for example, to a two-position valve, generally designated V to open in response to movement of the axial operating rod 16 in one direction and to close in response to movement of the axial operating rod in the opposite direction.

Since the axial operating rod 16 rotates with the rotor, it is connected by a ball bearing 22 to a non-rotary extension rod 24. The inner end of the extension rod 24 forms a cylindrical cup 25 that slides in a guide sleeve 26 in the end of the motor housing 10, this cup fixedly embracing the outer race of the ball bearing 22. The outer end of the extension rod 24 is connected to the bell crank 18 by means of a lateral pin 28 that extends through a slot 30 in the bell crank arm.

As viewed in FIGURE 1, the axial operating rod 16 may be moved from a left limit position to a right limit position by a pair of centrifugal weights 32 and may be moved from its right limit position to its left limit position by a similar second pair of centrifugal weights 34. The operating rod is shown at its rightward limit position.

The right pair of centrifugal weights 32 are connected by a corresponding pair of cables 35 with a right piston 36 that is slidably mounted inside the cylindrical rotor 15, the two cables passing around a pair of corresponding guide pulley 38. A suitable coil spring 40 urges the right piston 36 to a central position adjacent a central stop ring 42 and thereby urges the weights 32 to their normal inward positions. Preferably, the two cables 35 are dimensioned to keep the piston 36 from making contact with the stop ring so that the two cables will be maintained taut by the spring 40.

In like manner, the left pair of centrifugal weights 34 are connected in a pair of cables 44 with a left piston 45 that is also slidingly mounted inside the rotor 15, the two cables passing around a corresponding pair of guide pulleys 46. A second coil spring 47 continuously urges the left piston 45 toward a normal central position at close spacing from the stop ring 42 thereby urging the weights 34 to their normal inward positions.

The two pistons 36 and 45 are slidingly mounted on a reduced end portion of the operating rod 16 for movement between an annular shoulder 48 and a stop ring 49 on the end of the operating rod. The range of relative movement between the operating rod 16 and each of the pistons 36 and 45 permitted by the annular shoulder 48 and the stop ring 49 is substantially equal to the range of piston movement by a pair of the weights. Thus each pair of weights has a lost motion connection with the operating rod 16.

Associated with the right pair of centrifugal weights 32, is a rotatably mounted right latch having a pair of latching arms 50. In like manner, associated with the left pair of centrifugal weights 34 is a similar left latching member having a diammetrical pair of latching arms 52 that are best shown in FIGURE 3. When the rotor 15 is rotated counterclockwise, as viewed in FIGURE 3, the left latch responds by engaging the left pair of centrifugal weights 34 to prevent centrifugal action thereof but the right latch remains disengaged from the right pair of centrifugal weights 32 so that the right pair of weights respond to centrifugal force by radially outward movement and thereby shift the right piston 36 to the right with corresponding rightward movement of the axial operating rod 16. In like manner, when the rotor 15 is rotated in the opposite clockwise direction, the right latch responds to the rotation by restraining the right pair of centrifugal weights 32 against outward movement and the left latch permits the left pair of weights 34 to fly outward to pull the left piston 45 to the left, thereby to move the axial operating rods 16 from its right limit position to its left limit position.

Each end of the rotor 15 is journalled in the motor housing 10 by a suitable ball bearing 54 and each end of the rotor is cut away to form a diammetrical opening 55 as shown in FIGURES 1 and 3. A pair of guide plates 56 for the corresponding pair of centrifugal weights is mounted at each end of the rotor in a plane perpendicular to the rotor axis. Each guide plate 56 extends into the diammetrical opening 55 and also extends half way around the peripheral wall of the rotor, the two guide plates abutting at parting lines 58 (FIGURE 3).

Each of the guide plates 56 has a radial guide slot 60 for cooperation with the corresponding centrifugal weight and a headed pin 62 carried by the corresponding centrifugal weight extends through this guide slot in a freely movable manner. In the construction shown, each of the headed pins 62 has an end portion extending through the weight for cooperation with the corresponding latch arm.

Each of the pair of latching arms 50 or 52 is integral with a cylindrical hub 65 that is journalled in the end of the cylindrical rotor 15 by means of a pair of ball bearings 66. As best shown in FIGURE 3, each of the latching arms 50 or 52 has a latching recess 68 to engage the corresponding pin 62 carried by the corresponding centrifugal weight to latch the weight at its radially inward position. Preferably, the outer end of each latch arm is beveled to provide a cam surface 70 as shown in FIGURE 3. Thus if a pair of latching arms are in the path of the spring-actuated return movement of a pair of centrifugal weights when the rotor stops, the pins 62 will strike the cam surfaces 70 at the outer ends of the latching arms to deflect the latching arms out of the way.

While the right and left latches for restraining the outward movements of the centrifugal weights may be controlled in various ways in various practices of the invention, the preferred practice is characterized by the concept of providing means to resist in a yielding manner the rotation of the two latch members with the rotor 15. Thus if a drag load is applied to the two rotary latch arms 52 in FIGURE 3 and the rotor 15 is rotated counterclockwise, the latching arms will tend to lag behind the rotation of the rotor with consequent clockwise rotation of the latching arms relative to the rotor to cause the latching arms to engage the pins 62 of the centrifugal weights 34. On the other hand, if the rotor 15 is rotated clockwise, the dragging action will cause the two latching arms 52 to rotate counter-clockwise relative to the rotor within the angular limits imposed by the diametrical opening 55 of the rotor and the latching arms 52 will swing to release positions as indicated by broken lines in FIGURE 3.

The desired drag load on each of the latch members may be provided by mounting stationary means on the motor housing 10 to restrain rotation of the two latch members in a yielding manner. For this purpose, a suitable ring, preferably an aluminum ring 72, is mounted on the outer end of each hub portion 65 of each of the two latches and a ring-shaped permanent magnet 74 is fixedly mounted in the motor housing 10 in close proximity to the aluminum ring. When the rotor 15 rotates and the two rotatably mounted latches tend to follow the rotation of the rotor, the relative rotation beween each aluminum ring 72 and the corresponding permanent magnet 74 sets up magnetic hysteresis in the aluminum rings with a consequent pronounced retarding effect on the rotation of the aluminum ring. Thus the provision of the aluminum ring and the associated permanent magnet provides a braking action to tend to retard the rotation of each of the latch members and does so without resort to mechanical friction.

The operation of this first embodiment of the invention may be readily understood from the foregoing description. It is apparent that the axial operating rod 16 will remain at either limit position so long as the rotor 15 is idle. FIGURE 1, for example, shows the axial operating rod 16 at its right limit position to which it has been moved previously by the pair of centrifugal weights 32.

If now the cylindrical rotor 15 is energized to rotate clockwise as viewed in FIGURE 3, the induced magnetic hysteresis will cause the two latch arms 52 to rotate counclock-wise relative to the rotor thereby releasing the corresponding pins 62 to free the pair of centrifugal weights 34. On the other hand, the drag load placed on the latching arms 50 at the other end of the rotor will rotate the latch arms 50 clockwise relative to the rotor to maintain effective engagement with the corresponding pins 62 thereby to prevent outward movement of the centrifugal weights 32. Consequently, the pair of centrifugal weights 34 will pull outward on the two cables 44 to move the left piston 45 to the left in opposition to the spring 47. The leftward movement of the left piston shifts the axial operating rod 16 to its opposite or left limit position as may be seen in FIGURE 2. When the motor is deenergized to stop the rotor 15, the spring 47 returns the piston 45 and the two weights 34 to their normal positions.

It is apparent that this first embodiment of the invention functions as a two-position actuator with the axial operating rod 16 remaining at whichever of the two limit positions to which it may be shifted by a pair of centrifugal weights. Thus the springs 40 and 47 that act on the pistons 36 and 45 respectively, do not act at any time against the load or resistance to longitudinal movement that is imposed on the axial operating rod 16 and need not be strong enough to act against the load.

An important feature of the invention is that failure of the axial operating rod 16 to yield to the centrifugal force generated by weights will not cause structural damage. Thus if for some reason the instrumentality operated by the link 20 does not respond to a pair of centrifugal weights and keeps the weights at their inner positions in opposition to centrifugal force, the rotor is free to rotate freely and the only effect is to place an axial load on the ball bearing 22. Thus while the device will generate an actuating force of surprisingly high magnitude, no damage can be caused by the actuating force in the event of mal-functioning of the instrumentality controlled by the device, since the actuating force does not directly oppose the rotation of the rotor 15. It is also to be noted that no damage can be caused by abruptly reversing the direction of rotation of the rotor 15.

If the load imposed on the axial operating rod 16 is substantially constant, for example if the axial operating rod 16 works against a dead weight, the longitudinal shift of the operating rod may tend to be unduly accelerated as it approaches the limit of its range of motion, since the force exerted by the outwardly moving centrifugal weight is nonlinear. Under such circumstances, it may be desirable to add a pair of auxiliary springs 75 and 76 to oppose the final thrusts of the two pistons 36 and 45, respectively. Each of the two springs 75 and 76 is of shorter length than the range of movement of the corresponding piston and therefore resists only the latter part of the operating movement of the piston. It is to be noted, however, that although the centrifugal weights may tend to accelerate substantially in the absence of the auxiliary springs 75 and 86, nevertheless, the acceleration is sufficiently gradual for smooth operation.

A further feature of the invention is that it is a relatively simple matter to seal the whole device hermetically so that the device may be used safely in an explosive atmosphere, or may be entirely submerged in a liquid. For this purpose, one end of the motor housing 10 may be sealed by a sheet metal closure 78 and the other end may be sealed by a bellows-type diaphragm 80. One end of the diaphragm 80 embraces a hub portion 82 of the motor housing 10 in a fluid-tight manner. The other end of the diaphragm 80 is apertured to receive the extension rod 24 and abuts a circumferential shoulder 84 of the extension rod in a fluid-tight manner.

FIGURE 4 shows a second embodiment of the invention which is largely identical with the structure heretofore described as indicated by the use of corresponding numerals to indicate corresponding parts. This form of the invention is a two-position actuator and assumes one limit position whenever it is deenergized and moves to an opposite limit position when it is energized.

The device shown in FIGURE 4 has an axial operating rod 16a to which a single piston 85 is fixedly connected. In the construction shown, the actuating rod 16a has a reduced end portion 86 which extends through the piston 85 and the piston is fixedly secured thereon by a retaining ring 88. In the manner heretofore described, the piston 85 is connected by the previously mentioned cables 35 to the previously mentioned pair of centrifugal weights 32. A suitable coil spring 90 corresponding to the previously described spring 40 acts in compression against the piston 85 to urge the piston to the normal position shown in FIGURE 4 when the motor is deenergized. The spring 90 differs from the previously mentioned spring 40, however, in being relatively strong since it is capable alone of actuating the axial operating rod 16a with the normal load imposed thereon.

With the piston 85 in the normal limit position shown in FIGURE 4, energization of the motor to accelerate the rotor 15 results in the centrifugal weights 32 overcoming the resistance of the spring 90, the centrifugal weights pulling the piston 85 to the right as viewed in FIGURE 4 to the second limit position of the operating rod 16a. As long as the motor remains energized to keep the rotor 15 rotating at high speed, the axial operating rod 16a maintains the right limit position. As soon as the motor is deenergized to permit the rotor 15 to come to rest, the spring 90 forces the axial operating rod 16a back to its normal position.

This second mode of operation permits the structure to be greatly simplified. Thus the motor need not be reversible; only a single pair of centrifugal weights and only a single piston are necessary; and no latch is required to releasably hold the pair of weights at their normal inward positions.

FIGURE 5 indicates how the structure heretofore described may be modified to provide a three-position actuator which normally assumes an intermediate or neutral position and may be energized in two opposite respects to assume two opposite limit positions selectively. Such an actuator may be employed, for example, to operate a three-way valve by remote control. To provide this mode of operation, it is necessary merely to change the mechanism inside the rotor, the rest of the construction being identical with the construction of the first described embodiment of the invention.

In FIGURE 5, an axial operating rod 16b is unitary with a slide cylinder 92, the operating rod being integral with a central transverse web 94 of the slide cylinder. Two relatively heavy or high rate compression springs 95 and 96 act against the opposite sides of the web 94 to hold the slide cylinder 92 normally at the intermediate position shown in FIGURE 5. Either of these two springs 95 and 96 is capable of returning the operating rod 16b to this neutral position in opposition to the operating load whenever the rotor stops rotating.

The slide cylinder 92 has two radial flanges 98 and 100 on its opposite ends respectively and a pair of ring shaped pistons 102 and 104 slidingly and movably embrace the slide cylinder between these two flanges. As heretofore described, a stop ring 105 is mounted inside the rotor 15a between the two pistons 102 and 104. The piston 102 is connected by a pair of cables 106 and 108 with the previously mentioned pair of centrifugal weights 32, these two cables passing around corresponding guide pulleys 110 and 112. In like manner, the piston 104 is connected by cables 114 and 115 with the previously mentioned centrifugal weights 34, the cables passing around corresponding guide pulleys 116 and 118. A relatively light coil spring 120 acts in compression to urge the piston 102 to its normal position shown in FIGURE 5 and, in like manner, a similar spring 122 acts in compression to urge the piston 104 to its neutral position. These two springs, of course, also return the centrifugal weights to their normal inward positions.

With the parts of the mechanism of this third embodiment of the invention at their normal positions shown in FIGURE 5, the rotor 15a being stationary, the motor may be energized in one direction to cause the centrifugal weights 32 to pull the piston 102 to the right. During the initial portion of this rightward movement, the piston 102 merely slides along the slide cylinder 92 but during the latter part of this rightward movement, the piston is in abutment with the flange 98 and forces the slide cylinder together with the operating rod 16b to a rightward limit position in opposition to the coil springs 95 and 120. As long as the motor remains energized to rotate the rotor in this particular direction, the actuating rod 16b will be held at this right limit position. When the rotor is deenergized to permit the rotor 15a to stop, the heavy spring 95 restores the operating rod 16b to its neutral or intermediate position and the light spring 120 returns the piston 102 to its normal position. Reverse energization of the motor to rotate the rotor 15a in the opposite direction causes the centrifugal weights 34 to move the piston 104 to the left thereby to move the slide cylinder 92 together with the actuating rod 16b to the left limit position.

When a spring is used to restore the position of the actuating rod when the rotor stops as in the constructions shown in FIGURES 4 and 5, a spring may be selected that will result in the spring being compressed to various degrees at various rates of rotation of the rotor within the speed range of the motor and a variable speed motor may be employed to make it possible to compress the spring to various degrees selectively, thereby to shift the actuating rod to various degrees selectively. FIGURE 6 shows how a variable speed motor 124 may be employed with the actuator mechanism of FIGURE 5 for this purpose. The reversible motor 124 may be energized in its two directions selectively by a pair of switches 125 and 126 and the speed of the motor may be regulated by means of a rheostat 128 having a movable contact 130. The rheostat 128 may have a scale 132 calibrated to represent the different positions of the operating rod 16b.

In such a combination, the motor 124 may have a top speed of 12,000 r.p.m. for example, and a speed of approximately 5,000 r.p.m. may be necessary to move the operating rod 16b a fraction of an inch in opposition to the springs. At 9,000 r.p.m. say, the magnitude of the centrifugal force is sufficient to move the actuating rod 16b to a limit position to that between 5,000 and 9,000 r.p.m. the operating rod may take various positions in accord with the speed of rotation, with the spring in equilibrium with the centrifugal weights at each of these positions.

The purpose of FIGURE 7 is to illustrate how the invention may be modified for the application of rotary acuating force instead of linear actuating force. In FIGURE 5, an axial operating rod 16b extends through a bellows type diaphragm 80 in the manner heretofore described. The outer end portion of the axial operating rod 16b has a helical screw thread 134 which engages a corresponding screw thread in a rotary member 135 the rotary member 135 is journalled in a bearing sleeve 136 in an angular arm 138 on the end of the motor housing 10b. In the construction shown, a portion of the rotary member 135 is in the form of a gear 140 that may be used to transmit the rotary actuating force to any desired instrumentality.

It is apparent from the foregoing description of the selected embodiments of the invention, that any or all of the previously mentioned requirements for an ideal actuating device may be readily met. Using a 12,000 r.p.m. motor to handle an operating load that normally requires only 8,000 to 9,000 r.p.m. provides a liberal margin of operating force to make the device reliable and capable of handling unusual increases in the operating load. A motor incorporating the invention may be as small as 2¼" diameter and 1¼" in axial dimension and operating with 400 cycle current may exert a thrust of 250 lbs. through a stroke of 1". Since the motor accelerates to generate the actuating force, the actuating force is progressive with consequent smooth operation. Since the centrifugal force is generated with equal effectiveness in the opposite directions of rotation of the motor, the action is positive in both directions. Since the motor is free to rotate from the start, a motor may be used that has a low starting torque and it is further apparent that a relatively light motor using a relatively small amount of current may be employed to apply actuating force of relatively high magnitude over the short range of movement. If the operating load fails to yield the motor will merely accelerate to top speed without outward movement of the centrifugal weights and without causing any structural damage whatsoever.

The last embodiment of the invention illustrated by FIGURES 8, 9 and 10 is similar to the previously described embodiment as indicated by the use of corresponding numerals to indicate corresponding parts. In this instance, the rotor of the motor rotates in the same direction for shifting the axial operating rod 16 in both of its opposite directions and two latches for the centrifugal weights are adapted for selective actuation to determine in which direction the operating rod is moved. Such latches may be either normally engaged or normally disengaged.

A pair of latch arms 150 corresponding to the previously mentioned latched arm 50 cooperate with the pair of centrifugal weights 32a and in like manner a pair of latch arms 152 corresponding to the previously described latch arms 52 cooperate with the second pair of centrifugal weights 34a. Each of the two latches is of the same general construction as heretofore described, each pair of latch arms 150, or 152 being integral with a cylindrical hub 65a, that is journaled in the end of the rotor by means of a pair of ball bearings 66a. The usual aluminum ring 72a is mounted on the outer end of each hub portion 65a.

The rotor 15 rotates clockwise as viewed in FIGURE 9 and each of the two pairs of latch arms 150 and 152 also rotate clockwise for engagement with the pins 62a of the corresponding pair of centrifugal weights. Each pair of latch arms 150 or 152 is held in its normal clockwise latching position by means of a light hair spring 154. One end of the hair spring 154 is anchored to the rotor 15a, and the other end is attached to one of the corresponding pair of latch arms.

Instead of permanent magnets to create a dragging effect on the aluminum rings 72a, electromagnets are used, one electromagnet 155 being incorporated in one end of the housing 10 and a second electromagnet 156 being incorporated in the other end. It is apparent that if the electromagnet 155 is energized to create a dragging effect on the corresponding two latch arms 152 while the rotor 15 is rotating, the latch arms 152 lag with respect to the rotor and are thus rotated counterclockwise relative to the rotor to release the normally latched pair of centrifugal weights 34a. In like manner, if the second electromagnet 156 is energized, it causes similar release rotation of the latch arms 150 to release the other pair of normally latched centrifugal weights 32a. Thus with the rotor 15 rotating at a speed to cause the centrifugal weights to move radially outward, the two electromagnets 155 and 156 may be energized selectively to release the corresponding pairs of centrifugal weights and thus cause the axial operating rod 16a to be shifted in the selected longitudinal direction.

The wiring diagram in FIGURE 10 shows how this last embodiment of the invention may be controlled from a remote station that is indicated by a rectangle 158. One wire 160 connects the electromotive source with one side of the motor. The other wire from the electromotive source is connected to a switch arm 162 which is normally in a neutral position as shown. One of the two alternate switch contacts 164 is connected to the other side of the motor through the electromagnet 156. Thus if the switch arm 162 at the control station is moved to either contact 164 or contact 165, it will energize the rotor for rotation in its one direction but in the two instances different electromagnets are energized. Movements of the switch arm 162 to the switch contact 164 energizes the electromagnet 155 to release the centrifugal weights 34a for a leftward shift of the operating rod 16a as viewed in FIGURE 8. In like manner, movement of the switch arm 162 to the contact 165 energizes the electromagnet 156 to release the centrifugal weights 32a for a rightward shift of the operating rod 16a.

It is apparent that if the centrifugal weights 32a and 34a in FIGURE 8 are operatively associated with the operating rod 16a in the manner illustrated by FIGURES 1 and 2, the operating rod 16a will remain in one of its two limit positions when the motor is deenergized. Thus the arrangement shown in FIGURE 8 may be employed for a two-position actuator which remains in either position to which it may be moved. On the other hand, if the centrifugal weights are operatively associated with the operating rod 16a in the manner shown in FIGURE 5, the operating rod will return to an intermediate neutral position whenever the motor is deenergized.

My description in specific detail of the selected embodiments of the invention by way of example and to illustrate the principles involved will suggest various changes, substitutions and other departures from my disclosure that properly lie within the spirit and scope of the appended claims.

I claim:

1. An actuator having in combination: first weight means and second weight means, each movable relative to an axis of rotation between a normal radially inward position and a second radially outward position in response to centrifugal force; yielding means to urge both said weight means towards their normal inward positions; operating means movable in one direction in response to outward movement of said first weight means and movable in the opposite direction in response to outward movement of said second weight means; and means to actuate said first and second means by centrifugal force selectively thereby to move said operating member in its two directions selectively.

2. An actuator as set forth in claim 1 in which said operating means has a lost motion connection with each of said weight means for response to the outward movement of each weight means without response to the inward movement thereof.

3. An actuator as set forth in claim 2 in which said operating means is movable to two opposite limit positions by said first and second weight means respectively; and which includes centralizing yielding means to place said operating means at an intermediate position in the absence of centrifugal force acting on the first and second means.

4. An actuator having in combination: rotor means; first and second weight means, each mounted on said rotor means for centrifugal movement from a normal inward position to an outward position in response to rotation of the rotor means; yielding means to return said first and second weight means to their normal positions in the absence of dominating centrifugal force; an operating means movable in two opposite directions in response to outward movement of said first and second weight means, respectively; and means to actuate said rotor means and at the same time to latch said first and second weight means, selectively, at their normal inward positions thereby to actuate said operating means in its opposite directions, selectively.

5. A combination as set forth in claim 4 in which said operating means has a given range of motion between two limit positions and has an operating connection with each of said weight means, each of said operating connections having a range of lost motion of the order of magnitude of said given range; and which includes centralizing means to move said operating means to an intermediate point in said given range when said rotor means stops.

6. A combination as set forth in claim 5 in which said centralizing means comprises spring means.

7. An actuator having in combination: rotor means; first and second weight means, each mounted on said rotor means for centrifugal movement from a normal inward position to an outward position in response to rotation of the rotor means; yielding means to return said first and second weight means to their normal positions in the absence of dominating centrifugal force; an operating means movable in two opposite directions in response to outward movement of said first and second weight means, respectively; means to rotate said rotor means in opposite directions, selectively; and means to latch said first and second weight means at their normal positions in response to opposite directions of rotation respectively of said rotor means whereby rotation of the rotor means in opposite directions causes movement of said operating means in opposite directions.

8. An actuator as set forth in claim 7 in which said latch means comprises two latch members mounted on said rotor means for latching movement relative thereto in two opposite rotary directions respectively; and which includes stationary means to yieldingly oppose movement of said latch members with said rotary means thereby to drag one latch member to its latching position and to drag the other latch member out of its latching position when said rotor means rotates in one direction and vice versa.

9. An actuator as set forth in claim 8 in which said stationary means is magnetically coupled with both said latch members.

10. An actuator as set forth in claim 9 in which at least portions of said latch members are made of nonmagnetic material and which includes stationary magnet means to oppose movement of said latch members by magnetic hysteresis in said material.

11. An actuator as set forth in claim 7 in which said operating means has a given range of motion between two limit positions and has an operating connection with each of said weight means, each of said operating connections providing a range of lost motion of the order of magnitude of said given range; and which includes centralizing means to move said operating means to an intermediate point in said given range when said rotor means stops.

12. In a system wherein an actuator is controlled from a remote control station, the combination of: a rotor; weight means mounted on said rotor for outward movement thereon through a range of positions by centrifugal force; operating means operatively connected to said weight means for actuation thereby; a variable speed motor separate from said operating means and separate from said weight means to actuate said rotor over a given speed range; spring means opposing the outward movement of said weight means, the strength and rate of said spring means being selected for equilibrium between the centrifugal force and the force exerted by the spring means at different points in said range whereby the position of said operating means may be varied selectively by varying the speed of the variable speed motor; a circuit for energizing said motor and for varying the speed of the motor over said range; and control means in said circuit at said remote control station.

13. An actuator as set forth in claim 4 in which said operating means has a given range of motion between two limit positions and has an operating connection with each of said weight means, each of said operating connections having a range of lost motion of the order of magnitude of said given range whereby the operating means when moved to one of said limit positions by outward movement of one of said weight means remains at said limit position until the other weight means moves outward.

14. An actuator as set forth in claim 7 in which said operating means has a given range of motion between two limit positions and has an operating connection with each of said weight means, each of said operating connections providing a range of lost motion of the order of magnitude of said given range whereby the operating means when moved to one of said limit positions by outward movement of one of said weight means remains at said limit position until the other weight means moves outward.

References Cited in the file of this patent

UNITED STATES PATENTS

| | | |
|---|---|---|
| 1,322,451 | Jeanin | Nov. 18, 1919 |
| 1,638,531 | Jeanin | Aug. 9, 1927 |
| 1,977,015 | Rodler | Oct. 16, 1934 |
| 2,298,621 | Holland-Letz | Oct. 13, 1942 |
| 2,452,807 | Thompson | Nov. 2, 1948 |
| 2,596,751 | Wild | May 13, 1952 |

FOREIGN PATENTS

| | | |
|---|---|---|
| 22,496 | Great Britain | of 1906 |
| 172,845 | Austria | Oct. 25, 1952 |
| 309,232 | Italy | June 30, 1933 |